United States Patent
Zeng et al.

(10) Patent No.: US 7,366,705 B2
(45) Date of Patent: Apr. 29, 2008

(54) CLUSTERING BASED TEXT CLASSIFICATION

(75) Inventors: Hua-Jun Zeng, Beijing (CH); Xuanhui Wang, Champaign, IL (US); Zheng Chen, Beijing (CH); Benyu Zhang, Beijing (CH); Wei-Ying Ma, Beijing (CH)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 10/921,477

(22) Filed: Aug. 16, 2004

(65) Prior Publication Data
US 2005/0234955 A1    Oct. 20, 2005

Related U.S. Application Data

(60) Provisional application No. 60/562,911, filed on Apr. 15, 2004.

(51) Int. Cl.
G06E 1/00 (2006.01)
G06E 3/00 (2006.01)
G06F 15/18 (2006.01)
G06G 7/00 (2006.01)

(52) U.S. Cl. .................................................. 706/20
(58) Field of Classification Search ............. 706/20
See application file for complete search history.

(56) References Cited

U.S. PATENT DOCUMENTS

| 5,297,042 | A |   | 3/1994  | Morita          |        |
|-----------|---|---|---------|-----------------|--------|
| 5,361,628 | A | * | 11/1994 | Marko et al.    | 73/116 |
| 5,418,948 | A |   | 5/1995  | Turtle          |        |
| 5,442,778 | A |   | 8/1995  | Pedersen et al. |        |
| 5,488,725 | A |   | 1/1996  | Turtle et al.   |        |
| 5,694,592 | A |   | 12/1997 | Driscoll        |        |
| 5,812,134 | A |   | 9/1998  | Pooser et al.   |        |
| 5,819,258 | A |   | 10/1998 | Vaithyanathan et al. | |
| 5,845,278 | A |   | 12/1998 | Kirsch et al.   |        |
| 5,987,460 | A |   | 11/1999 | Niwa et al.     |        |
| 6,003,027 | A |   | 12/1999 | Prager          |        |

(Continued)

FOREIGN PATENT DOCUMENTS

DE    10029644    1/2002

(Continued)

OTHER PUBLICATIONS

CBC: clustering based text classification requiring minimal labeled data Hua-Jun Zeng; Xuan-Hui Wang; Zheng Chen; Hongjun Lu; Wei-Ying Ma; Data Mining, 2003. ICDM 2003. Third IEEE International Conference on Nov. 19-22, 2003 pp. 443-450 Digital Object Identifier 10.1109/ICDM.2003.1250951.*

(Continued)

*Primary Examiner*—Michael B. Holmes
(74) *Attorney, Agent, or Firm*—Lee & Hayes, PLLC (57) ABSTRACT

Systems and methods for clustering-based text classification are described. In one aspect text is clustered as a function of labeled data to generate cluster(s). The text includes the labeled data and unlabeled data. Expanded labeled data is then generated as a function of the cluster(s). The expanded label data includes the labeled data and at least a portion of unlabeled data. Discriminative classifier(s) are then trained based on the expanded labeled data and remaining ones of the unlabeled data.

35 Claims, 5 Drawing Sheets

U.S. PATENT DOCUMENTS

| | | | |
|---|---|---|---|
| 6,006,225 | A | 12/1999 | Bowman et al. |
| 6,112,202 | A | 8/2000 | Kleinberg |
| 6,167,398 | A | 12/2000 | Wyard et al. |
| 6,169,986 | B1 | 1/2001 | Bowman et al. |
| 6,188,776 | B1* | 2/2001 | Covell et al. ............... 382/100 |
| 6,226,408 | B1* | 5/2001 | Sirosh ........................ 382/224 |
| 6,298,351 | B1* | 10/2001 | Castelli et al. ............. 707/102 |
| 6,400,828 | B2* | 6/2002 | Covell et al. ............... 382/100 |
| 6,470,307 | B1 | 10/2002 | Turney |
| 6,556,983 | B1* | 4/2003 | Altschuler et al. ............ 706/55 |
| 6,560,600 | B1 | 5/2003 | Broder |
| 6,615,209 | B1 | 9/2003 | Gomes et al. |
| 6,628,821 | B1* | 9/2003 | Covell et al. ............... 382/155 |
| 6,697,998 | B1* | 2/2004 | Damerau et al. ........... 715/512 |
| 6,711,585 | B1 | 3/2004 | Copperman et al. |
| 6,742,003 | B2 | 5/2004 | Heckerman et al. |
| 6,760,714 | B1 | 7/2004 | Caid et al. |
| 6,772,120 | B1* | 8/2004 | Moreno et al. ............. 704/256 |
| 6,892,193 | B2* | 5/2005 | Bolle et al. ................... 706/20 |
| 6,944,602 | B2* | 9/2005 | Cristianini ................... 706/12 |
| 7,136,876 | B1 | 11/2006 | Adar et al. |
| 2002/0015366 | A1 | 2/2002 | Sawano |
| 2002/0178153 | A1 | 11/2002 | Nishioka et al. |
| 2003/0046389 | A1 | 3/2003 | Thieme |
| 2003/0065632 | A1 | 4/2003 | Hubey |
| 2003/0110181 | A1 | 6/2003 | Schuetze et al. |
| 2003/0200198 | A1 | 10/2003 | Chandrasekar et al. |
| 2003/0208482 | A1 | 11/2003 | Kim et al. |
| 2003/0226100 | A1 | 12/2003 | Farahat et al. |
| 2003/0233370 | A1 | 12/2003 | Barabas et al. |
| 2004/0010331 | A1 | 1/2004 | Terada et al. |
| 2004/0117189 | A1 | 6/2004 | Bennett |
| 2004/0249808 | A1 | 12/2004 | Azzarn et al. |
| 2005/0015366 | A1 | 1/2005 | Carrasco et al. |
| 2005/0055321 | A1 | 3/2005 | Fratkina et al. |
| 2005/0097188 | A1 | 5/2005 | Fish |
| 2005/0216443 | A1 | 9/2005 | Morton et al. |

FOREIGN PATENT DOCUMENTS

| | | |
|---|---|---|
| EP | 0809197 | 11/1997 |
| EP | 1320042 | 6/2003 |
| WO | WO9749048 | 12/1997 |
| WO | WO9948028 | 9/1999 |

OTHER PUBLICATIONS

Labeling unclustered categorical data into clusters based on the important attribute values Hung-Leng Chen; Kun-Ta Chuang;Ming-Syan Chen; Data Mining, Fifth IEEE International Conference on Nov. 27-30, 2005 Page(s):8 pp. Digital Object Identifier 10.1109/ICDM.2005.85.*

Text classification with enhanced semi-supervised fuzzy clustering Keswani, G.; Hall, L.O.; Fuzzy Systems, 2002. Fuzz-IEEE'02. Proceedings of the 2002 IEEE International Conference on vol. 1, May 12-17, 2002 pp. 621-626 Digital Object Identifier 10.1109/Fuzz.2002.1005064.*

Biased clustering methods for image classification Santos, R.; Ohashi, T.; Yoshida, T.; Ejima, T.; Computer Graphics, Image Processing, and Vision, 1998. Proceedings. SIBGRAPI '98. International Symposium on Oct. 20-23, 1998 pp. 278-285 Digital Object Identifier 10.1109/SIBGRA.1998.722761.*

Constrained minimun cut for classification using labeled and unlabeled data Li, C.H.; Computer Vision and Pattern Recognition, 2001. CVPR 2001. Proceedings of the IEEE Computer Society Conference on vol. 2, 2001 pp. II-597-II-602 vol. 2 Digital Object Identifier 10.1109/CVPR.2001.991017.*

Clustering unlabeled data with SOMs improves classification of labeled real-world data Dara, R.; Kremer, S.C.; Stacey , D.A.; Neural Networks, 2002. IJCNN '02. Proceedings of the 2002 International Joint Conference on vol. 3, May 12-17, 2002 pp. 2237-2242 Digital Object Identifier 10.1109/IJCNN.2002. 1007489.*

Homotopy-Based Semi-Supervised Hidden Markov Tree Analysis Dasgupta, N.; Shihao Ji; Carin, L.; Acoustics, Speech and Signal Processing, 2006. ICASSP 2006 Proceedings. 2006 IEEE International Conference on vol. 2, May 14-19, 2006 pp. ll-97-ll-100*

A robust semi-supervised EM-based clustering algorithm with a reject option Saint-Jean, C.; Freicot, C.; Pattern Recognition, 2002. Proceedings. 16th International Conference on vol. 3, Aug. 11-15, 2002 pp. 399-402 vol.3.*

Cluster analysis using self-organizing maps and image processing techniques Costa, J.A.F.; de Andrade Netto, M.L.; Systems, Man, and Cybernetics, 1999. IEEE SMC '99 Conference Proceedings. 1999 IEEE International Conference on vol. 5, Oct. 12-15, 1999 pp. 367-372 vol. 5.*

Learning with constrained and unlabelled data Lange, T.; Law, M.H.C.; Jain, A.K.; Buhmann, J.M.; Computer Vision and Pattern Recognition, 2005. CVPR 2005. IEEE Computer Society Conference on vol. 1, Jun. 20-25, 2005 pp. 731-738 vol. 1.*

Clustering-training for Data Stream Mining Shuang Wu; Chunyu Yang; Jie Zhou; Data Mining Workshops, 2006. ICDM Workshops 2006. Sixth IEEE International Conference on Dec. 2006 pp. 653-656.*

Semi-supervised image database categorization using pairwise constraints Grira, N.; Crucianu, M.; Boujemaa, N.; Image processing, 2005. ICIP 2005. IEEE International Conference on vol. 3, Sep. 11-14, 2005 pp. III-1228-III-1231.*

Semi-Supervised Clustering of Corner-Oriented Attributed Graphs Jin Tang; Chunyan Zhang; Bin Luo; Hybrid Intelligent Systems, 2006. HIS '06. Sixth International Conference on Dec. 2006 pp. 33-33.*

Categorization and keyword identification of unlabeled documents Ning Kang; Domeniconi, C.; Barbara, D.; Data Mining, Fifth IEEE International Conference on Nov. 27-30, 2005 p. 4 pp.*

Subspace Clustering and Label Propagation for Active Feedback in Image Retrieval Tao Qin; Tie-Yan Liu; Xu-Dong Zhang; Wei-Ying Ma; Hong-Jiang Zhang; Multimedia Modelling Conference, 2005. MMM 2005. Proceedings of the 11th International Jan. 12-14, 2005 pp. 172-179.*

Robust classifiers by mixed adaptation Gutfinger, D.; Sklansky, J.; Pattern Analysis and Machine Intelligence, IEEE Transactions on vol. 13, Issue 6, Jun. 1991 pp. 552-567.*

Equilibrium-Based Support Vector Machine for Semisupervised Classification Lee D. ; Lee J. ; IEEE Transactions on Neural Networks : Accepted for future publication vol. pp, Issue 99, 2007 pp. 1-1.*

Semi-supervised feature selection via multiobjective optimization Handl, J.; Knowles, J.; Neural Networks, 2006. IJCNN '06. International Joint Conference on Jul. 16-21, 2006 pp. 3319-3326.*

A Generalized K-Means Algorithm with Semi-Supervised Weight Coefficients Morii, F.; Pattern Recognition, 2006. ICPR 2006. 18th International Conference on vol. 3, Aug. 20-24, 2006 pp. 198-201.*

Efficient Margin-Based Query Learning on Action Classification Shimosaka, M.; Mori, T.; Sato, T.; Intelligent Robots and Systems, 2006 IEEE/RSJ International Conference on Oct. 2006 pp. 2778-2784.*

A comparison between criterion functions for linear classifiers, with an application to neural nets Barnard, E.; Casasent, D.; Systems, Man and Cybernetics, IEEE Transactions on vol. 19, Issue 5, Sep.-Oct. 1989 pp. 1030-1041 Digital Object Identifier 10.1109/21. 44018.*

Boosting Classifiers for Music Genre Classification Bagci, U.; Erzin, E., Signal Processing and Communications Applications, 2006 IEEE 14th Apr. 17-19, 2006 pp. 1-3 Digital Object Identifier 10.1109/SIU.2006.1659881.*

Human Balance Estimation using a Wireless 3D Acceleration Sensor Network Simila, H.; Kaartinen J.; Lindholm, M.; Saarinen, A.; Mahjneh, I.; Engineering in Medicine and Biology Society, 2006. EMBS '06. 28th Annual International Conference of the IEEE Aug. 2006 pp. 1493-1496 Digital Object Identifier 10.1109/IEMBS. 2006.260126*

Incremental learning in autonomous systems: evolving connectionist systems for on-line image and speech recognition Kasabov, N.; Zhang, D.; Pang, P.S.; Advanced Robotics and its Social Impacts, 2005. IEEE Workshop on Jun. 12-15, 2005 pp. 120-125 Digital Object Identifier 10.1109/ARSO.2005.1511636.*

Chakrabarti S."Data Mining for Hypertext: A tutorial survey" SIGKDD Explorations vol. 1 Issue 2, Jan. 2000, 11 pages.

Cohn et al.; "The Missing Link—A Probabilistic Model of Document Content and Hypertext Connectivity" Proceedings of Neural Information Processing Systems, 2001, 7 pages.

Dhillon et al.; "Efficient Clustering of Very Large Document Collections" Data Mining,for Scientific and Engineering Applications, Chapter 1, Kluwer Academic Publishers, 2001, pp. 1-25.

Liu et al.; "Clustering Through Decision Tree Construction" 9th International Conference on Information and Knowledge Management, 2000, 10 pages.

Kleinberg J. M.; "Authoritative Sources in a Hyperlinked Environment" Proceedings of the ACM-SIAM Symposium on Discrete Algorithms, 1998, 34 pages.

Heer et al.; "Identification of Web User Traffic Composition using Multi-Modal Clustering and Information Scent" 1st SIAM ICDM Workshop on Web Mining. Chicago 2001. 13 pages.

Gibson et al.; "Inferring Web Communities from Link Topology" Proceedings of the 9th ACM Conference on Hypertext and Hypermedia, 1998, 17 pages.

Neville et al; "Iterative Classification in Relational Data" Proceedings AAAI-2000 Workshop on Learning Statistical Models form Relational Data, AAAI Press 2000, pp. 42-49.

Steinbach et al.; "A Comparison of Document Clustering Techniques" 6th ACM SIGKDD World Text Mining Conference Boston, 2000, 2 pages.

Su et al.; "Correlation-based Document Clustering using Web Logs" Proceedings of the 34th Hawaii International Conference on Sytem Sciences, 2001, 7 pages.

Taskar et al.; "Probabilistic Classification and Clustering in Relational Data" Proceedings of the 34th Hawaii International Conference on System Sciences. 2001. 7 pages.

Unger et al.; "Clustering Methods for Collaborative Filtering" In Workshop on Recommendation System at the 15th National Conference on Artificial Intelligence, 1998, 16 pages.

Wen et al.; "Query Clustering Using User Logs" ACM Transactions on Information Systems vol. 20 No. 1; Jan. 2002, pp. 59-81.

Zeng et al; "A Unified Framework for Clustering Heterogeneous Web Objects" Proceedings of the 3rd international Conference of Web Information System Engineering, Singapore 2002, 10 pages.

"Open Directory Project" http://dmoz.org/ Netscape 1998-2004 1 page.

Berkhin P.; "Survey of Clustering Data Mining Techniques" Accrue Software Inc.; 2002 pp. 1-56.

Yang et al.; "A Comparative Study on Feature Selection in Text Categorization" Proceedings of the Fourteenth International Conference on Machine Learning, Morgan Kaufmann Publishers Inc., San Francisco 1997, pp. 412-420.

Chen et al.; "Building a Web Thesaurus from Web Link Structure" SIGIR 2003 Toronto Canada; Jul. 2003; 8 pages.

Slattery S. et al.; "Combining Statistical and Relational Methods for Learning in Hypertext Domains" Lecture Notes in Computer Science, 1998, pp. 38-52.

Kim et al, "A Comparison of Collocation-Based Similarity Measures in Query Expansion", Information Processing & Management, Elsevier Science Ltd, vol. 35, No. 1, Jan. 1999 pp. 19-30.

Qiu et al, "Concept Based Query Expansion", SIGIR Forum, Association for Computing Machinery, New York, Jun. 27, 1993, pp. 160-169.

Raghavan et al, "On the Reuse of Past Optimal Queries", SIGIR '95, Proceedings of the 18th Annual International ACM SIGIR Conference on Research and Development in Information Retrieval, Jul. 9, 1995, pp. 344-350.

Beeferman D. & Berger A. "Agglomerative clustering of a search engine query log" Proceedings of the ACM SIGKDD. International cnference on Knowledge Discovery and Data Mining, ACM, US, 2000, pp. 407-416, XP002339640.

Srivastava et al. "Discovery and Applications of Usage Patterns from Web Data" Sigkdd Explorations, Jan. 2000 (2000-20001), pp. 12-23, XPoo2241892 the whole document.

Attardi, G. et al.: "Automatic web Page Categorization by Link and context Analysis" Proceedings of THIA, European Symposium on Intelligence, 1999. the whole document.

Brin S et al: "The anatomy of a large-scale hypertextual web search engine" Computer Networks and ISDN Systems, North Holland Publishing. Amsterdam, NL, vol. 30, No. 1-7, Apr. 1998, pp. 107-117.

Harmandas, V. et al. "Image Retrieval by Hypertext Links" Association For Computing Machinery. Proceedings of the 20th Annual INternational ACM-SIFIR Conference on Research and Development in INformation Retrieval. Philadelphia, PA, Jul. 27-31, 1997, pp. 296-303.

Smith, J.R. et al.: "An Image and Video Search Engine for the World-Wide Web" Storage and retrieval for image and video databases 5. San Jose, Feb. 13-14, 1997, Proceedings of SPIE, Bellingham, SpIE, US, vol. 3022, pp. 84-95.

Westerveld, T. et al: "Retriving Web Pages using Content Links, URLs and Anchors" Test Retrieval Conference. Proceedings, XX, XX, Nov. 13, 2001,pp. 683-672.

Boyan et al., "A Machine Learning Architecture for Optimizing Web Search Engines", AAAI Workshop on Internet-Based Information Systems, 1996, pp. 1-8, Retrieved from the Internet http://www.cs.cornell.edu/People/tj/publications/boyan_etal_96a.pdf.

Frei et al., "The Use of Semantic Links in Hypertext Information Retrieval" Information Processing & Management, Elsevier, Barking, GB, vol. 31, No. 1, Jan. 2, 1995, pp. 1-13.

Li, "Toward a Qualitive Search Engine" Internet Computing, IEEE, vol. 2, No. 4, Jul. 1998, pp. 24-29, Retrieved from the Internet at http://ieeexplore.ieee.org/xpl/abs_free.jsp?arNumber=707687.

Marchioro, Massimo, "The Quest for Correct Information on the Web: Hyper Search Engines" Computer Networks and ISDN Systems, North Holland Publishing. Amsterdam, NL, vol. 29, No. 8-13, Sep. 1997, pp. 1225-1235.

Huaizhong et al., Similarity Model and Term Association For Document Categorization, Sep. 2-6, 2002, pp. 256-260.

Kim et al., "A Comparison of Collocation-Based Similarity Measures in Query Expansion", Inform ation Processing and Management, Elsevier, Garking, GB, vol. 35, No. 1, Jan. 1999, pp. 19-30.

McDonald, et al., "Evaluating a Content Based Image Retrieval System", SIGIR'01, Sep. 9-12, 2001, ACM, 2001, pp. 232-240.

Shaw, Term-Relevance Computautions and Perfect Retrieval Performance Information Processing and Management, Elsevier, Barking, GB, vol. 31, No. 4, Jul. 1995, pp. 491-498.

Yeung et al., "Improving Performance of Similarity-Based Clustering by Feature Weight Learning," Apr. 2002, vol. 24, Issue 4, pp. 556-561.

Jespersen, et al., "Evaluating the Markov Assumption for Web Usage Mining", ACM, 2003, pp. 82-89.

Jimenez, et al., "The Influence of Semantics in IR using LSI and K-means Clustering Techniques", retrieved on May 8, 2007, at <<http://portal.acm.org/citation.cfm?id=963656&jmp=abstract&coll=ACM&dl=ACM&CFID..>>, ACm, vol. 19, 2003, pp. 278-284.

Li, et al., "Research and Design of an Efficient Collaborative Filtering Predication Algorithm", IEEE, 2003, pp. 171-174.

Mahajan, et al, "Improved Topic-Dependent Language Modeling Using Information Retrieval Techniques", IEEE, 1999, pp. 541-544.

Myka, et al., "On Automatic Similarity Linking in Digital Libraries", IEEE, 1997, 278-283.

* cited by examiner

CLUSTERING BASED TEXT CLASSIFICATION

RELATED APPLICATIONS

This patent application claims priority to U.S. provisional patent application Ser. No. 60/562,911, titled "Clustering Based Text Classification", filed on Apr. 15, 2004, which is hereby incorporated by reference.

TECHNICAL FIELD

This disclosure relates to data mining, and more particularly to text clustering and text classification.

BACKGROUND

Text classification is a supervised learning task of assigning natural language text documents to one or more predefined categories or classes according to their contents. While it is a classical problem in the field of information retrieval for a half century, it is currently attracting an increased amount of attention due to an ever-expanding amount of text documents available in digital data format. Text classification is used in numerous fields including, for example, auto-processing of emails, filtering of junk emails, cataloguing Web pages and news articles, etc.

Text classification algorithms that utilize supervised learning typically require sufficient training data so that an obtained classification model can be used for sufficient generalization. As the amount of training data for each class decreases, the classification accuracy of traditional text classification algorithms dramatically degrades. In practical applications, labeled documents are often very sparse because manually labeling data is tedious and costly, while there are often abundant unlabeled documents. As a result, there is much interest in exploiting unlabeled data in text classification. The general problem of exploiting unlabeled data in supervised learning leads to a semi-supervised learning or labeled-unlabeled problem in different context.

The problem, in the context of text classification, could be formalized as follows. Each sample text document is represented by a vector $x \in \Re^d$. We are given two datasets $D_l$ and $D_u$. Dataset $D_l$ is a labeled dataset, consisting of data samples $(x_i, t_i)$, where $1 \leq i \leq n$, and $t_i$ is the class label with $1 \leq t_i \leq c$. Dataset $D_u$ is an unlabeled dataset, consisting of unlabeled sample data $x_i$, $n+1 \leq i \leq n+m$. The semi-supervised learning task is to construct a classifier with small generalization error on unseen data based on both $D_l$ and $D_u$. There have been a number of work reported in developing semi-supervised text classification recently.

While it has been reported that those methods obtain considerable improvement over other supervised methods when the size of training dataset is relatively small, these techniques are substantially limited when the labeled dataset is relatively small, for instance, when it contains less than ten (10) labeled examples in each class. This is not unexpected, since these conventional techniques (e.g. co-training, TSVM and EM) typically utilize a similar iterative approach to train an initial classifier. This iterative approach is heavily based on the distribution presented in the labeled data. When the labeled data includes a very small number of samples that are distant from corresponding class centers (e.g., due to high dimensionality), these techniques will often have a poor starting point. As a result, these techniques will generally accumulate more errors during respective iterations.

In view of the above, semi-supervised learning methods construct classifiers using both labeled and unlabeled training data samples. While unlabeled data samples can help to improve the accuracy of trained models to certain extent, existing methods still face difficulties when labeled data is not sufficient and biased against the underlying data distribution.

SUMMARY

Systems and methods for clustering-based text classification are described. In one aspect text is clustered as a function of labeled data to generate cluster(s). The text includes the labeled data and unlabeled data. Expanded labeled data is then generated as a function of the cluster(s). The expanded label data includes the labeled data and at least a portion of unlabeled data. Discriminative classifier(s) are then trained based on the expanded labeled data and remaining ones of the unlabeled data.

BRIEF DESCRIPTION OF THE DRAWINGS

In the Figures, the left-most digit of a component reference number identifies the particular Figure in which the component first appears.

DETAILED DESCRIPTION

Overview

The following systems and methods for clustering based text classification (CBC) utilize both labeled and unlabeled data in semi-supervised learning operations. The systems and methods first cluster training data, which includes labeled and unlabeled data, with guidance of the labeled data. At least a portion of the unlabeled data is then labeled based on the obtained clusters to generate an expanded labeled dataset. In one implementation, discriminative classifiers are then trained with the expanded labeled dataset. In this manner, the systems and methods provide for semi-supervised learning treated as clustering aided by labeled data. Such labeled data may provide important information for latent class variables, assisting in the determination of parameters associated with clustering operations to affect final clustering results. By latent class variables we mean that the variables used to generate the data samples.

For instance, if we use X to represent the latent variables and Y to represent the observed data sample, then we can describe the data dependency by the conditional probability P(Y|X). We often try as much as possible to model this probability distribution by some simplified distributions such as polynomial or Gaussian so as to simplify the parameter estimations. Additionally, in one implementation, label information is propagated to unlabeled data according to clustering results. Expanded labeled data can be used in subsequent discriminative classifiers to obtain a substantially low generalization error on unseen data. Because of these operations, CBC outperforms existing algorithms when the size of labeled dataset is very small.

CBC implements the semi-supervised learning by clustering aided by labeled data, while existing methods implement it by classification aided by unlabeled data.

Semi-Supervised Learning

As discussed above, the systems and methods for semi-supervised CBC uses both the labeled dataset $D_l$ and the unlabeled dataset $D_u$ to construct a classification model. However, how the unlabeled data could help in classification is not a trivial problem. Different methods were proposed according to different view of unlabeled data.

Expectation-Maximization (EM) has a long history in semi-supervised learning. The motivation of EM is as follows. Essentially, any classification method is to learn a conditional probability model $P(t|x,\theta)$, from a certain model family to fit the real joint distribution $P(x, t)$. With unlabeled data, a standard statistical approach to assessing the fitness of learned models $P(t|x,\theta)$ is $$\sum_{x \in D_l} \log P(x \mid t_i, \theta) P(t_i) + \sum_{x \in D_u} \log \sum_t P(x \mid t, \theta) P(t) \qquad (1)$$

where the latent labels of unlabeled data are treated as missing variables. Given Eq. 1, a Maximum Likelihood Estimation (MLE) process can be conducted to find an optimal $\theta$. Because the form of likelihood often makes it difficult to maximize by partial derivatives, Expectation-Maximization (EM) algorithm is generally used to find a local optimal $\theta$. Theoretically if a $\theta$ close to the global optima could be found, the result will also be optimal under the given model family. However, the selection of a plausible model family is difficult, and the local optima problem is serious especially when given a poor starting point. For example, in one approach, EM is initialized by Naive Bayes classifiers on labeled data, which may be heavily biased when there is no sufficient labeled data.

Co-Training and Transductive Support Vector Machine (TSVM) methods show sometimes superior performance over EM. For instance, a Co-Training method splits the feature set by $x=(x^1, x^2)$ and trains two classifiers $\theta_1$ and $\theta_2$ each of which is sufficient for classification, with the assumption of compatibility, i.e. $P(t|x_1,\theta_1)=P(t|x_2,\theta_2)$. Co-Training uses unlabeled data to place an additional restriction on the model parameter distribution $P(\theta)$, thus improving the estimation of real $\theta$. The algorithm initially constructs two classifiers based on labeled data, and mutually selects several confident examples to expand the training set. This is based on the assumptions that an initial "weak predictor" could be found and the two feature sets are conditional independent. However, when labeled dataset is small, it is often heavily biased against the real data distribution. The above assumptions will be seriously violated.

TSVM adopts a totally different way of exploiting unlabeled data. TSVM maximizes margin over both the labeled data and the unlabeled data. TSVM works by finding a labeling $t_{N+1}, t_{n+2}, \ldots, t_{n+m}$ of the unlabeled data $D_u$ and a hyperplane $<w, b>$ which separates both $D_l$ and $D_u$ with maximum margin. TSVM expects to find a low-density area of data and constructs a linear separator in this area. Although empirical results indicate the success of the method, there is a concern that the large margin hyperplane over the unlabeled data is not necessary to be the real classification hyperplane. In text classification, because of the high dimensionality and data sparseness, there are often many low-density areas between positive and negative labeled examples.

For purposes of discussion, we briefly describe concepts of high dimensionality, data sparseness, and positive and negative labeled examples. If we represent each data example as a vector (in text domain, a vector is composed of TF*IDF values for each keywords), then it can be denoted by a point in a high-dimensional space (because there are typically several hundreds of thousands of vocabularies for text document, each of which is a component of the vector). In such a high dimensional space, one data example is often far from another example. This is called the data sparseness. SVM-like classifiers treat the multi-class problem as a combination of multiple binary classification problem (in which data examples can only be labeled as either positive or negative), so it seeks to find a hyperplane to separate the two examples.

Instead of using two conditional independent features in the co-training setting, two SVM classifiers can be co-trained using two feature spaces from different views. One is the original feature space and the other is derived from clustering the labeled and unlabeled data. Two hybrid algorithms have been proposed, co-EM and self-training, using two randomly split features in co-training setting. This technique has determined that co-training is better than non-co-training algorithms such as self-training.

As a summary, existing semi-supervised methods still work in the supervised fashion, that is, they pay more attention to the labeled dataset, and rely on the distribution presented in the labeled dataset heavily. With the help of the unlabeled data, extra information on data distribution can help to improve the generalization performance. However, if the number of samples contained in the labeled data is extremely small, such existing algorithms may not work well as the labeled data can hardly represent the distribution in unseen data from the beginning. This is often the case for text classification where the dimensionality is very high and a labeled dataset of small size just represents a few isolated points in a huge space.

Figure 1:
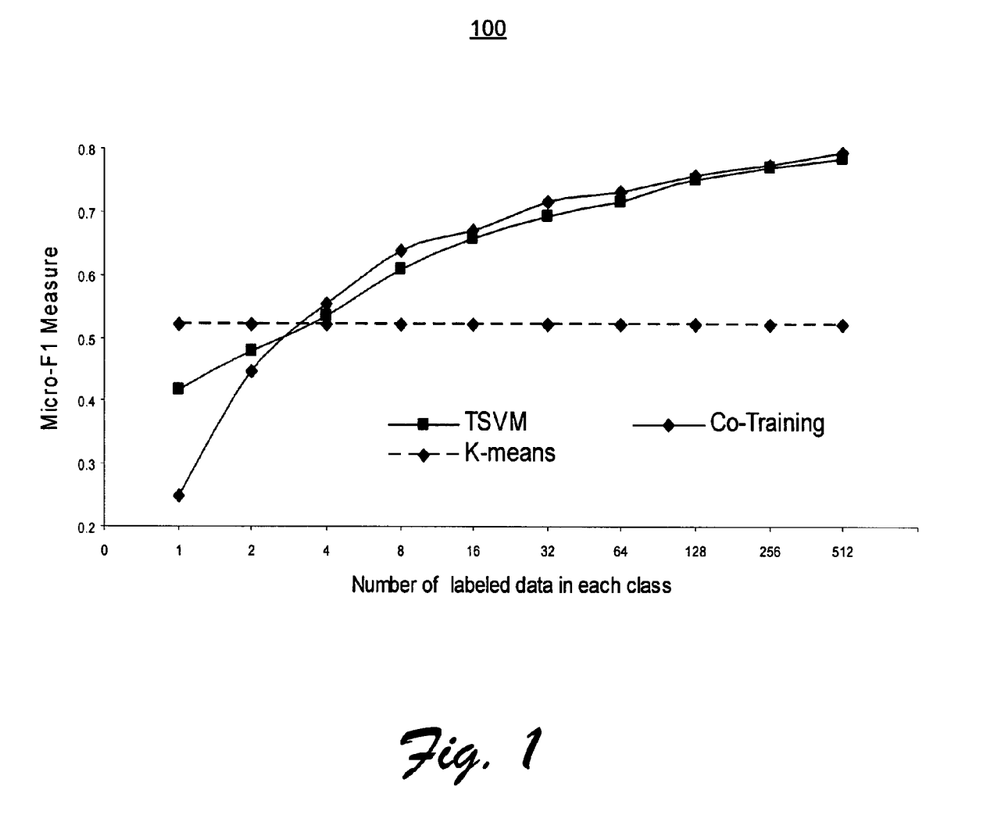
FIG. 1 shows results of applying two algorithms (TSVM and co-training) to a semi-supervised text classification problem as well as a pure text clustering algorithm (k-means).

FIG. 1 shows results of applying two algorithms to a text classification problem, wherein the number of classes is equal to 5 and the number of training samples equal 4000. The X-axis is the number of samples in each class, and the Y-axis is their performance in terms of $F_{Micro}$, that as defined below. We can see that the performance of both algorithms degrades dramatically when the number of samples in each class dropped to less than a threshold number, which is this example, is 16. In FIG. 1, we depict another line, the dotted line, to indicate the performance using a clustering method, K-means, to cluster the same set of training data. In the experiments, we ignore the labels; hence in contrast to the algorithms used to generate data for the other two lines, the dotted line represents performance of unsupervised learning. It is interesting to see that when the number of labeled data in each class is less than 4, unsupervised learning in fact gives better performance than both semi-supervised learning algorithms. Results such as this indicate that a clustering based approach to the problem of semi-supervised learning would be useful.

Clustering Based Classification

Figure 2:
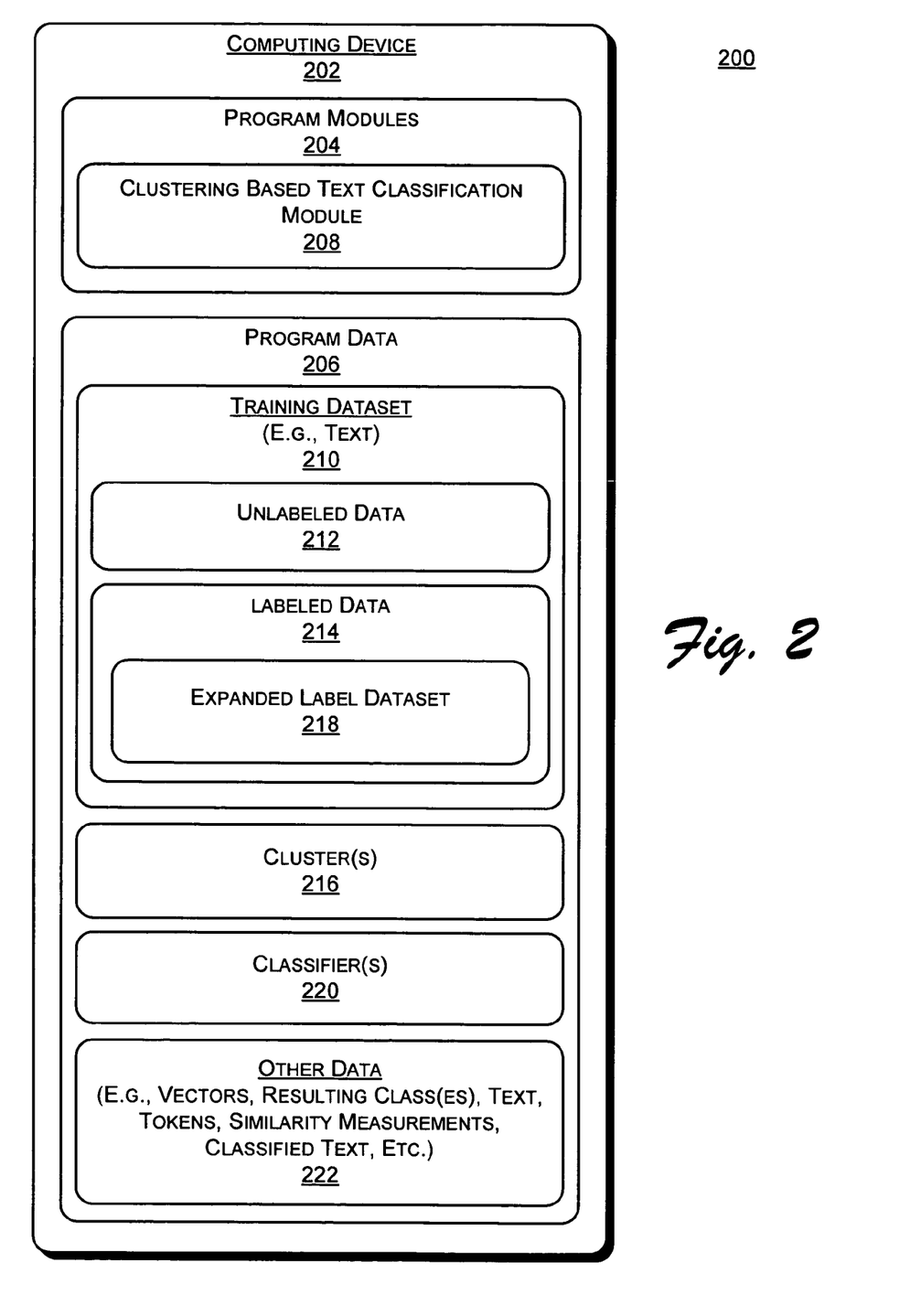
FIG. 2 illustrates an exemplary computing device for clustering based text classification.

FIG. 2 illustrates an exemplary system 200 for clustering based text classification. System 200 includes computing device 202, including program module(s) 204 and program data 206. Program modules include, for example, cluster based text classification (CBC) module 208 for clustering training dataset 210. Exemplary data sets 210, may comprise data relating to any activity or subject matter. In one implementation, the data set 210 included material from commonly used datasets such as 20-Newsgroups, Reuters-21578, and Open Directory Project (ODP) web pages. CBC module 208 clusters unlabeled data 212 with the guidance of labelled data 214 to generate clusters 216. CBC module 208 expands the labeled data 214 according to the clustering result. To this end, CBC module 208 determines that at least a portion of the unlabeled data 212 can be viewed as labeled dataset 214 with high confidence. It is this portion that represents expanded label dataset 218. Criteria for determining when unlabeled data can be used as labeled data for the expanded label dataset 218 are described below.

The expanded labeled dataset 218 is used to construct the final classification model. CBC module 208 trains classifiers 220 with the label data 214, which now includes expanded labeled dataset 218 and the remaining unlabeled data 212 (i.e., the unlabeled data minus the unlabeled data that is not being treated as part of the expanded label dataset 218).

Figure 3:
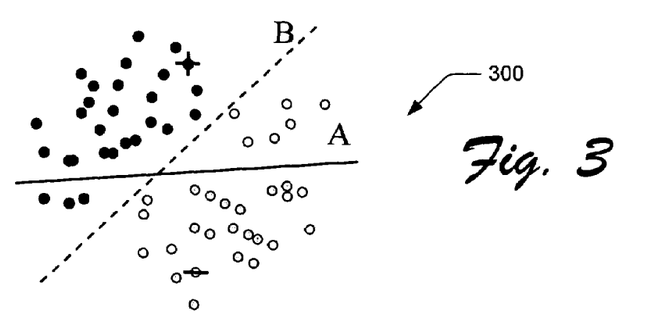
FIG. 3 shows exemplary results of a conventional clustering approach with original labeled data.

FIG. 3 shows exemplary results of a conventional clustering approach with original labeled data. The black points and grey points in the Figure represent data samples of two different classes. We have very small number of labeled data, e.g. one for each class, represented by the points with "+" and "−" signs. A classification algorithm trained with these two points will most likely find line "A" as shown in as the class boundary; and it's also rather difficult to discover the real boundary B even with the help of the unlabeled data points. Firstly, this is because the initial labeled samples are highly biased, they will cause poor starting points for iterative reinforcement algorithms such as Co-Training and EM. Moreover, TSVM algorithm may also result in line A because it happens to lie in a low density area. In fact in a feature space with high dimensionality, a single sample is often highly biased; and many low density areas will exist.

Figure 4:
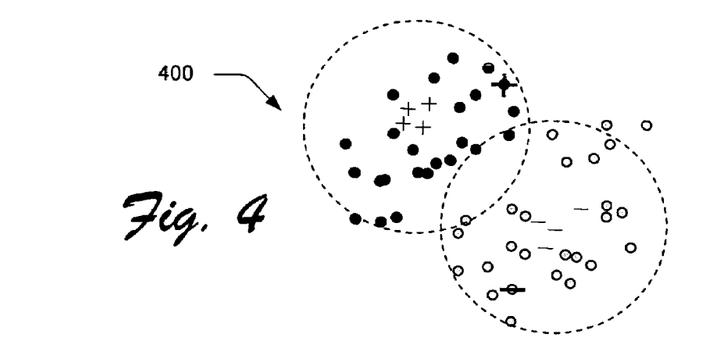
FIG. 4 shows exemplary clustering based text classification results using more labeled data.
Figure 5:
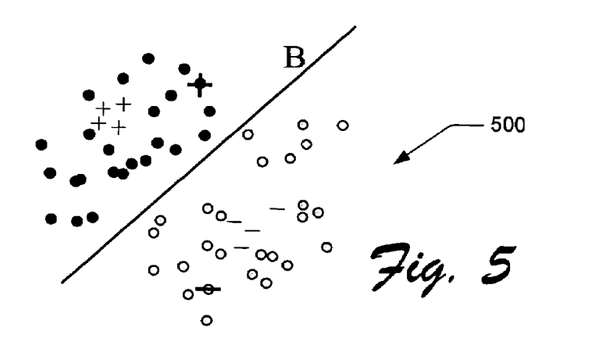
FIG. 5 shows exemplary clustering based text classification results using expanded labeled data and remaining unlabeled data to train a classifier.

FIGS. 4 and 5 show exemplary results of the systems and methods for clustering based text classification. For purposes of discussion, aspects of FIGS. 2 and 3 are discussed with respect to the features of FIG. 2. The left-most digit of a component reference number identifies the particular Figure in which the component first appears. As described above, CBC module 208 applies a clustering algorithm to training dataset 210. In these examples, these clustering operations result in two clusters. The black and gray data points are unlabeled examples. The big "+" and "−" are two initially labeled example, and small "+" and "−" are examples expanded by clustering. CBC module 208 propagates the labels of the labeled data samples 214 to the unlabeled samples 212 which are closest to cluster centroids to generate expanded label dataset 218. As a result, we have more labeled data samples 214, as shown in FIG. 4. CBC module 208 uses the expanded labeled data 214 and remaining unlabeled data 212 to train a classifier 220. As the result, CBC module 208 identifies a substantially better class boundary, as shown in FIG. 5.

This approach combines merits of both clustering and classification methods. Clustering operations reduce the impact of any bias caused by initial sparse labeled data. With sufficient expanded labeled data, the CBC module 208 uses discriminative classifiers to achieve better generalization performance than pure clustering methods. More particularly, clustering methods are more robust to the bias caused by the initial sparse labeled data. Let us take k-means, the most popular clustering algorithm as an example. In essence, k-means is a simplified version of EM working on spherical Gaussian distribution models. They can be approximately described by MLE of k spherical Gaussian distributions, where the means $\mu_1, \ldots, \mu_k$ and the identical covariances $\Sigma$ are latent variables. Thus with the aid of labeled data, the objective is to find an optimal $\theta = <\mu_1, \ldots, \mu_k, \Sigma>$ to maximize the log-likelihood of Eq. 1 where the $P(x|t_i, \theta)$ equals to $$\frac{1}{(2\pi)^{d/2} \cdot |\Sigma|^{1/2}} \cdot \exp\left(-\frac{1}{2}(x-\mu_i)^T \Sigma^{-1}(x-\mu_i)\right) \qquad (2)$$

When the number of labeled examples is small, the bias of labeled example will not affect much the likelihood estimation and the finding of the optimal $\theta$.

Second, methodology of CBC module 208 represents a generative classifier, i.e., it constructs a classifier derived from the generative model of its data $P(x|t,\theta)$. The generative classifier and discriminative classifier (such as logistic regression, which is a general form of SVM) has been theoretically and empirically analyzed with respect to asymptotic performance. This analysis shows that generative classifiers reach their asymptotic performance faster than discriminative classifiers. For at least these reasons, CBC module 208 clustering operations are more effective with small training data, and make it easier to achieve high performance when labeled data is sparse. To address the problem that generative classifiers usually lead to higher asymptotic error than discriminative classifiers, discriminative classification method such as TSVM can be used in the second step of our approach, i.e., after clustering unlabeled data and expanding the labeled data set.

CBC module 208 clustering is guided by labeled data. Generally, clustering methods address the issue of finding a partition of available data which maximizes a certain criterion, e.g. intra-cluster similarity and inter-cluster dissimilarity. The labeled data is used to modify the criterion. There are also some parameters associated with each clustering algorithm, e.g. the number k in k-means, or split strategy of dendrogram in hierarchical clustering. The labeled data can also be used to guide the selection of these parameters. In this implementation, CBC module 208 uses a soft-constraint version of k-means algorithm for clustering, where k is equal to the number of classes in the given labeled data set. The labeled data points are used to obtain the initial labeled centroids, which are used in the clustering process to constraint the cluster result.

Combining Clustering with Classification

Two-step clustering based classification, i.e., clustering followed by classification, can be viewed as a conceptual approach. Another strategy of combining clustering and classification is through iterative reinforcement. That is, we first train a clustering model $L_1$ based on all available data, obtaining an approximately correct classifier. Afterwards, we select from unlabeled data examples that are confidently classified by $L_1$ (i.e. examples with high likelihood) and combine them with original labeled data to train a new model $L_2$. Because more labeled data are used, the obtained $L_2$ is expected to be more accurate and can provide more confident training examples for $L_1$. We use the new labeled dataset to train $L_1$ again. This process is iterated until all examples are labeled.

We now describe how the labeled dataset 214 is expanded. In principle, we can just assign the label to the most confident p % of examples from each of the resulting clusters. If we choose p=100% after first clustering process, we actually have a two-step approach. First, we determine the value of p. The selection of p is a tradeoff between the number of labeled samples and possible noise introduced by the labeling error. Obviously, with higher p, a large labeled dataset will be obtained. In general, a classifier with higher accuracy can be obtained with more training samples. On the other hand, when we expand more samples, we might introduce incorrectly labeled samples into the labeled dataset, which become noise and will degrade the performance of a classification algorithm. Furthermore, small p means more iteration in the reinforcement process.

We choose "confident examples" of unlabeled data 212 for expanding the labeled dataset 214. Note that any learned model is an estimation of the real data model P(x,t). We can find examples that are confidently classified by a given model if a slightly change of θ has no impact on them. When more examples are given, the model estimation will become more accurate, and the number of confident examples will grow. As illustrated in FIGS. 4 and 5, even when some of the data points are wrongly classified, the most confident data points, i.e. the ones with largest margin under classification model and the ones nearest to the centroid under clustering model, are confidently classified. That is, a slightly change of the decision boundary or centroid will not affect the label of these data.

We assume that class labels t are uniformly distributed. Since the Gaussian is spherical, the log-likelihood of a given data point and the estimated label is $$\log(P(x^*,t^*|\theta)) = \log(P(x^*|t^*,\theta)P(t^*|\theta)) = -c_1\|x-\mu^*\|^2 + c_2 \quad (3)$$

where $c_1$ and $c_2$ are positive constants. The most probable points in a single Gaussian distribution are the points that are nearest to the distribution mean.

To get the most confident examples from the result of TSVM, we draw a probabilistic view of the TSVM. Let us take logistic regression as an example, which is a general form of discriminative methods. The objective is to maximize $$\sum_i \log \frac{1}{1+e^{-y_i f(x_i,\theta)}} \quad (4)$$

where $f(x_i,\theta)$ is some linear function depending on the parameter θ. θ is typically a linear combination of training examples. Under the margin maximization classifier such as SVM, the likelihood of a given point $x^*$ and its label $t^*=+$ can be derived from the above equation:

$$P(x^*,+) = P(x)\left(1 - \frac{1}{1+\exp\left(\sum_j t_j (\sum_k \beta_j^k)(x_j \cdot x) + b\right)}\right) \quad (5)$$

which considers points with largest margin the most probable.

An Exemplary Procedure

Figure 6:
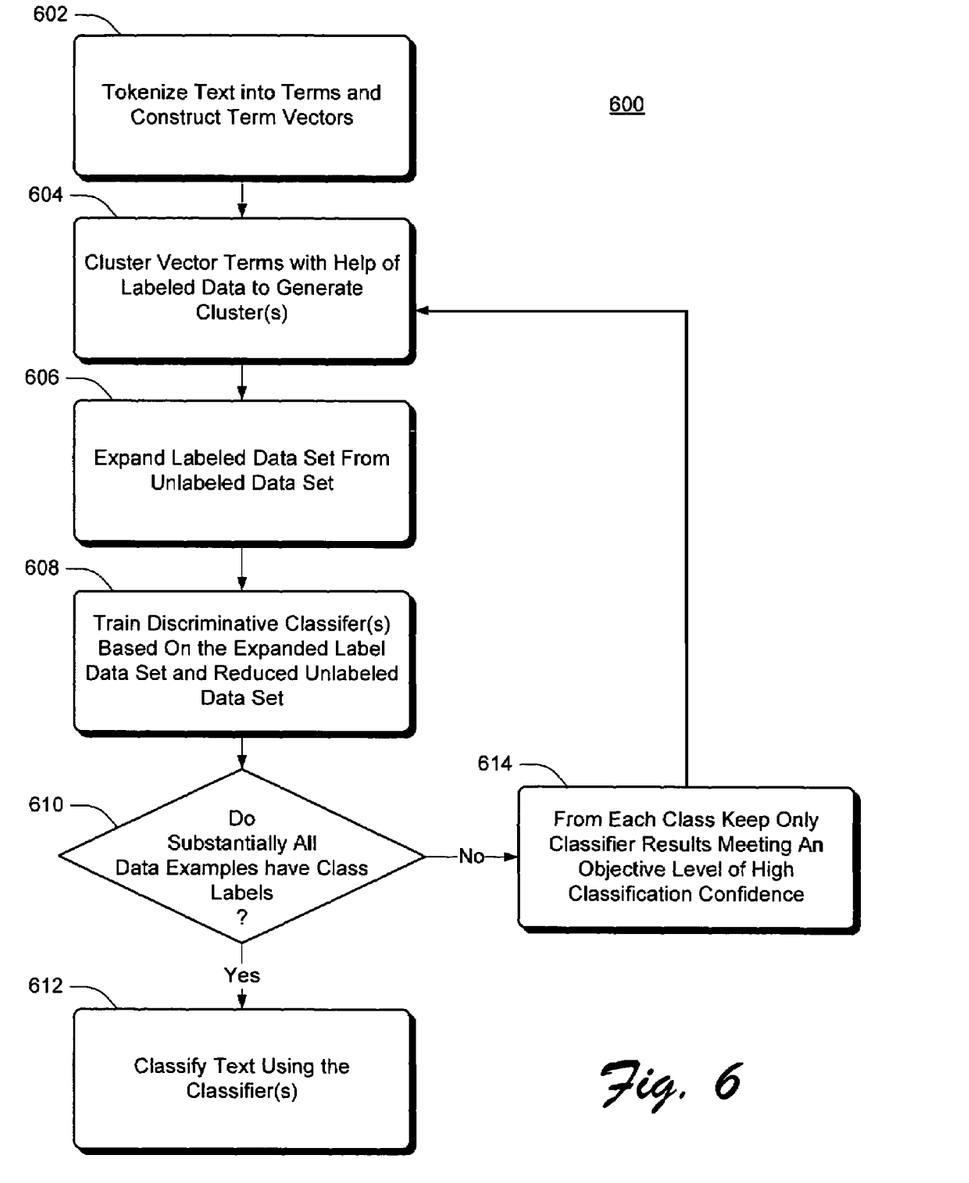
FIG. 6 shows an exemplary procedure for clustering based text classification of system of FIGS. 2 and 7.

FIG. 6 shows an exemplary procedure 600 for clustering based text classification of system 200 of FIG. 2. For purposes of discussion, aspects of procedure 600 are discussed with respect to the features of FIG. 2. The left-most digit of a component reference number identifies the particular Figure in which the component first appears. In this implementation, the detailed algorithm of CBC module 208, is applied to text data (training dataset 210), which is generally represented by sparse term vectors in a high dimensional space.

At block 602, CBC module 208 tokenizes all documents of data set 210 into terms and constructs one component for each distinct term. Such tokenized information and resulting vectors are shown by respective portions of "other data" 222 of FIG. 2. Thus each document is represented by a vector $(w_{i1}, w_{i2}, \ldots, w_{id})$ where $w_{ij}$ is weighted by TFIDF, i.e. $w_{ij} = TF_{ij} \times \log(N/DF_j)$, where N s total number of documents. The term vectors are normalized.

At block 604, CBC module 208 clusters the tokenized terms with the help of labeled data 214 to generate cluster(s) 216. In this implementation, CBC module 208 implements an iterative reinforcement strategy. During each iteration, a soft-constrained version of k-means is used for clustering. We compute the centroids of the labeled data for each class (which is called "labeled centroids") and use them as the initial centroids for k-means. (Such computed centroids are shown as a respective portion of "other data" 222). The k value is set to the number of classes in the labeled data 214. CBC module 208 runs k-means on both labeled 214 and unlabeled data 212. The iterative loop is terminated when clustering result doesn't change anymore, or just before a labeled centroid being assigned to a wrong cluster. This sets "soft constraints" on clustering because the constraints are not based on exact examples but on their centroid. The constraints will reduce bias in the labeled examples. Finally, at least a portion of unlabeled data 212 are assigned labels as labeled centroid in the same cluster.

Exemplary operations of block 604 are described in greater detail, wherein input includes: labeled data set $D_l$, unlabeled data set $D_u$, the full labeled set $D_l' = D_l + (D_u, T_u^*)$. The current labeled and unlabeled data sets are initialized as $D_l' = D_l$, $D_u' = D_u$. These clustering operations are repeated until $D_u' = \emptyset$ (cluster result doesn't change any more).

1. Calculate initial centroids $$o_i = \sum_{\forall j, t_j = i} x_j,$$

i=1 . . . c, $x_j \in D_l$, and set current centroids $o_i^* = o_i$. The label(s) of the centroids $t(o_i) = t(o_i^*)$ are equal to labels of the corresponding examples.

2. Repeat until cluster result doesn't significantly change from previous cluster result(s).

a. Calculate the nearest centroids $o_j^*$ for each $o_i$. If $t(o_i) \neq t(o_j^*)$, exit the loop.
b. Assign $t(o_i^*)$ to each $x_i \in D_l + D_u$ that are nearer to $o_i^*$ than to other centroids.
c. Update current centroids $$o_i^* = \sum_{\forall j, t_j = i} x_j,$$

$i = 1 \ldots c$, $x_j \in D_l + D_u$.

3. From each cluster, select p % examples $x_i \in D_u'$ which is nearest to $o_i^*$, and add them to $D_l'$.

In this implementation, a cosine function is used as a similarity measure for two documents:

$$sim(doc_j, doc_k) = \sum_{i=1}^{d} w_{ij} \cdot w_{ik}.$$

This measure is also used in the clustering algorithm to calculate the distance from an example to a centroid (which is also normalized). This simple representation is efficient for supervised learning, e.g. in most tasks they are linear separatable.

At block 606, CBC module 208 selects substantially most confident examples (i.e. examples nearest to cluster centroids) to form a new labeled set 214, which includes expanded label dataset 218, together with remaining unlabeled data 212, to train a TSVM classifier 220.

At block 608, CBC module 208 trains discriminative classifier(s) 220 based on $D_l'$ and $D_u'$. In this implementation, CBC module 208 uses a TSVM classifier with a linear kernel. At block 610, it is determined whether all examples have class labels. If so, then the classifier(s) 220 are ready to be used to classify text. At block 612, text is classified using the classifier(s) 220. For purposes of illustration, text to be classified and classified text is shown as a respective portion of "other data" 122 of FIG. 1. If there are still unlabeled examples, clustering module 604 continues at block 614, to cluster vectors with the help of the new labeled data. To this end, from each resulting cluster or class (see "other data" 122 of FIG. 2), clustering module 604 or classification module 608 selects p % confident examples $x_i \in D_u'$ (i.e., examples with minimum distance to cluster centroids or examples with substantially maximum classification confidence), and adds them to $D_l'$. At this point, the procedure continues at block 604 as described above.

An Exemplary Operating Environment

Although not required, the systems and methods for clustering based text classification are described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 7:
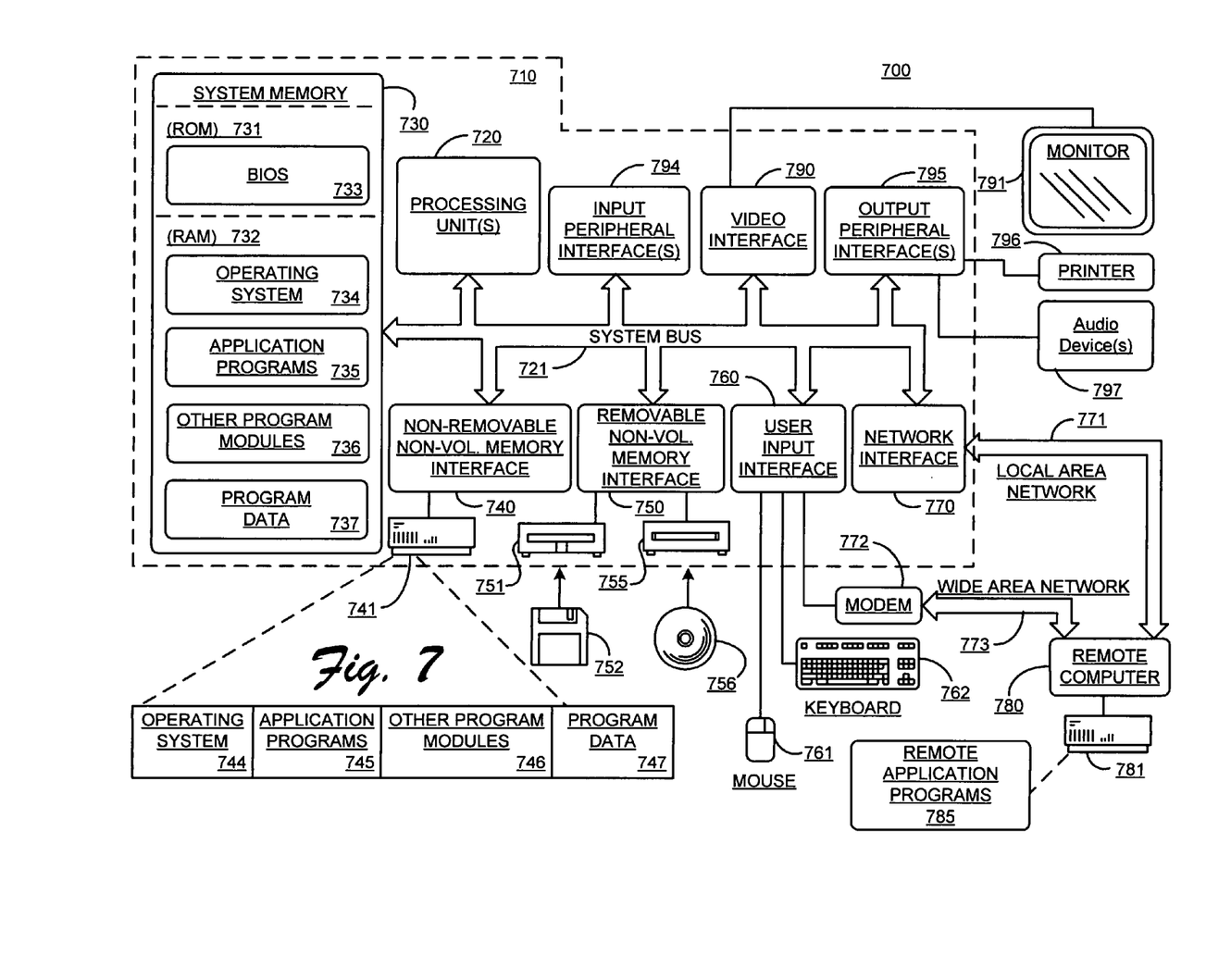
FIG. 7 illustrates an example of a suitable computing environment for clustering based text classification may be fully or partially implemented.

FIG. 7 illustrates an example of a suitable computing environment for clustering based text classification may be fully or partially implemented. Exemplary computing environment 700 is only one example of a suitable computing environment and is not intended to suggest any limitation as to the scope of use or functionality of systems and methods the described herein. Neither should computing environment 700 be interpreted as having any dependency or requirement relating to any one or combination of components illustrated in computing environment 700.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 7, an exemplary system for clustering based text classification includes a general purpose computing device in the form of a computer 710 implementing, for example, system 200 of FIG. 2. The following described aspects of computer 710 are exemplary implementations of client computing device 202 of FIG. 2. Components of computer 710 may include, but are not limited to, processing unit(s) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 710 typically includes a variety of computer-readable media. Computer-readable media can be any available media that can be accessed by computer 710 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example and not limitation, FIG. 7 illustrates operating system 734, application programs 735, other program modules 736, and program data 738.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746, and program data 748. Note that these components can either be the same as or different from operating system 734, application programs 735, other program modules 736, and program data 738. Application programs 735 includes, for example CBC module 208 of FIG. 2. Program data 738 includes, for example, training data set 210, cluster(s) 216, classifier(s) 220, and other data 222. Operating system 744, application programs 745, other program modules 746, and program data 748 are given different numbers here to illustrate that they are at least different copies.

A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 798 and printer 796, which may be connected through an output peripheral interface 795.

The computer 710 operates in a networked environment using logical connections to one or more remote computers, such as a remote computer 780. The remote computer 780 may be a personal computer, a server, a router, a network PC, a peer device or other common network node, and as a function of its particular implementation, may include many or all of the elements described above relative to the computer 710, although only a memory storage device 781 has been illustrated in FIG. 7. The logical connections depicted in FIG. 7 include a local area network (LAN) 781 and a wide area network (WAN) 783, but may also include other networks. Such networking environments are commonplace in offices, enterprise-wide computer networks, intranets and the Internet.

When used in a LAN networking environment, the computer 710 is connected to the LAN 781 through a network interface or adapter 780. When used in a WAN networking environment, the computer 710 typically includes a modem 782 or other means for establishing communications over the WAN 783, such as the Internet. The modem 782, which may be internal or external, may be connected to the system bus 721 via the user input interface 760, or other appropriate mechanism. In a networked environment, program modules depicted relative to the computer 710, or portions thereof, may be stored in the remote memory storage device. By way of example and not limitation, FIG. 7 illustrates remote application programs 785 as residing on memory device 781. The network connections shown are exemplary and other means of establishing a communications link between the computers may be used.

CONCLUSION

Although the systems and methods for clustering based text classification have been described in language specific to structural features and/or methodological operations or actions, it is understood that the implementations defined in the appended claims are not necessarily limited to the specific features or actions described. For instance, in one implementation, other clustering methods can be used and/or adjustments of the similarity measure with the aid of labeled examples. In yet another implementation, validity of two general classifiers is evaluated in the described CBC framework of system 200, confidence assessment, and noise control is also considered for additional performance improvements. Accordingly, the specific features and actions are disclosed as exemplary forms of implementing the claimed subject matter.

The invention claimed is:

1. A method for text classification, the method comprising:

clustering text comprising labeled data and unlabeled data in view of the labeled data to generate one or more clusters;

generating expanded labeled data as a function of the one or more clusters, the expanded label data comprising the labeled data and at least a portion of the unlabeled data;

training one or more discriminative classifiers based on the expanded labeled data and remaining ones of the unlabeled data; and generating, using the one or more discriminative classifiers, classified text for information retrieval.

2. A method as recited in claim 1, wherein the text exhibits high dimensionality and data sparseness.

3. A method as recited in claim 1, wherein the text exhibits a substantial number of low-density areas between positive and negative labeled examples.

4. A method as recited in claim 1, wherein a size of the labeled data is small as compared to a size of the unlabeled data.

5. A method as recited in claim 1, wherein the expanded labeled data provides information for one or more latent class variables.

6. A method as recited in claim 1, wherein clustering the text further comprises
generating initial centroids based on the labeled data; and
wherein generating the expanded labeled data is constrained by the initial centroids.

7. A method as recited in claim 1, wherein generating the expanded labeled data further comprises determining with a high confidence that the a t least a portion of the unlabeled data can be viewed as labeled data, the high confidence being based on proximity of respective ones of the a t least a portion of the unlabeled data to cluster centroids.

8. A method as recited in claim 1, wherein training the one or more discriminative classifiers further comprises propagating label data to the unlabeled data as a function of clustering results to obtain a substantially low generalization error on unseen data.

9. A method as recited in claim 1, wherein training the one or more discriminative classifiers further comprises combining clustering and classification through iterative reinforcement until all examples in a particular classifier of the one or more discriminative classifiers are labeled.

10. A method as recited in claim 9, wherein the one or more clusters are based on all available data and represent an approximately correct classifier $L_1$, and wherein the iterative reinforcement comprises aspects of the generating and the training comprising:
selecting unlabeled data samples from the unlabeled data, the unlabeled data samples being confidently classified as a function of $L_1$;
combining the unlabeled data samples with original labeled data to train a new model $L_2$; and
performing operations of the selecting and the combining until all examples in the new model are labeled.

11. A computer-readable medium having stored thereon computer-program instructions for text classification, the computer-program instructions being executable by a processor, the computer-program instructions comprising instructions for:
clustering text comprising labeled data and unlabeled data in view of the labeled data to generate one or more clusters;
generating expanded labeled data as a function of the one or more clusters, the expanded label data comprising the labeled data and at least a portion of the unlabeled data;
training one or more discriminative classifiers based on the expanded labeled data and remaining ones of the unlabeled data; and
generating, using the one or more discriminative classifiers, classified text for information retrieval;
wherein a size of the labeled data is small as compared to a size of the unlabeled data.

12. A computer-readable medium as recited in claim 11, wherein the text exhibits high dimensionality and data sparseness.

13. A computer-readable medium as recited in claim 11, wherein the text exhibits a substantial number of low-density areas between positive and negative labeled examples.

14. A computer-readable medium as recited in claim 11, wherein the expanded label data provides information for one or more latent class variables.

15. A computer-readable medium as recited in claim 11, wherein the computer-program instructions for clustering the text further comprise instructions for:
generating initial centroids based on the labeled data; and
wherein generating the expanded labeled data is constrained by the initial centroids.

16. A computer-readable medium as recited in claim 11, wherein the computer-program instructions for generating the expanded labeled data further comprise instructions for determining with a high confidence that the at least a portion of the unlabeled data can be viewed as labeled data, the high confidence being based on proximity of respective ones of the at least a portion of the unlabeled data to cluster centroids.

17. A computer-readable medium as recited in claim 11, wherein the computer-program instructions for training the one or more discriminative classifiers further comprise instructions for propagating label data to the unlabeled data as a function of clustering results to obtain a substantially low generalization error on unseen data.

18. A computer-readable medium as recited in claim 11, wherein the computer-program instructions for training the one or more discriminative classifiers further comprise instructions for combining clustering and classification through iterative reinforcement until all examples in a particular classifier of the one or more discriminative classifiers are labeled.

19. A computer-readable medium as recited in claim 18, wherein the one or more clusters are based on all available data and represent an approximately correct classifier $L_1$, and wherein the iterative reinforcement comprises aspects of the computer-program instructions for the generating and the training, the iterative reinforcement comprising instructions for:
selecting unlabeled data samples from the unlabeled data, the unlabeled data samples being confidently classified as a function of $L_1$;
combining the unlabeled data samples with original labeled data to train a new model $L_2$; and
performing operations of the selecting and the combining until all examples in the new model are labeled.

20. A computing device comprising:
a processor; and
a memory coupled to the processor, the memory comprising computer-program instructions executable by the processor for text classification, the computer-program instructions comprising instructions for:
clustering text comprising labeled data and unlabeled data in view of the labeled data to generate one or more clusters;
generating expanded labeled data as a function of the one or more clusters, the expanded label data comprising the labeled data and at least a portion of the unlabeled data;
training one or more discriminative classifiers based on the expanded labeled data and remaining ones of the unlabeled data; and
generating, using the one or more discriminative classifiers, classified text for information retrieval.

21. A computing device as recited in claim 20, wherein the text exhibits high dimensionality and data sparseness.

22. A computing device as recited in claim 20, wherein the text exhibits a substantial number of low-density areas between positive and negative labeled examples.

23. A computing device as recited in claim 20, wherein a size of the labeled data is small as compared to a size of the unlabeled data.

24. A computing device as recited in claim 20, wherein the expanded labeled data provides information for one or more latent class variables.

25. A computing device as recited in claim 20, wherein the computer-program instructions for clustering the text further comprise instructions for:

generating initial centroids based on the labeled data; and wherein generating the expanded labeled data is constrained by the initial centroids.

26. A computing device as recited in claim 20, wherein the computer-program instructions for generating the expanded labeled data further comprise instructions for determining with a high confidence that the at least a portion of the unlabeled data can be viewed as labeled data, the high confidence being based on proximity of respective ones of the at least a portion of the unlabeled data to cluster centroids.

27. A computing device as recited in claim 20, wherein the computer-program instructions for training the one or more discriminative classifiers further comprise instructions for propagating label data to the unlabeled data as a function of clustering results to obtain a substantially low generalization error on unseen data.

28. A computing device as recited in claim 20, wherein the computer-program instructions for training the one or more discriminative classifiers further comprise instructions for combining clustering and classification through iterative reinforcement until all examples in a particular classifier of the one or more discriminative classifiers are labeled.

29. A computing device as recited in claim 28, wherein the one or more discriminative clusters are based on all available data and represent an approximately correct classifier $L_1$, and wherein the iterative reinforcement comprises aspects of the computer-program instructions for the generating and the training, the iterative reinforcement comprising instructions for:

selecting unlabeled data samples from the unlabeled data, the unlabeled data samples being confidently classified as a function of $L_1$;

combining the unlabeled data samples with original labeled data to train a new model $L_2$; and performing operations of the selecting and the combining until all examples in the new model are labeled.

30. A computing device comprising:

clustering means to cluster text comprising labeled data and unlabeled data in view of the labeled data to generate one or more clusters;

generating means to generate expanded labeled data as a function of the one or more clusters, the expanded label data comprising the labeled data and at least a portion of the unlabeled data;

training means to train one or more discriminative classifiers based on the expanded labeled data and remaining ones of the unlabeled data; and generating means to classify text based on the one or more discriminative classifiers to create classified text for information retrieval.

31. A computing device as recited in claim 30, wherein the means for clustering the text further comprise:

generating means to generate initial centroids based on the labeled data; and wherein generating the expanded labeled data is constrained by the initial centroids.

32. A computing device as recited in claim 30, wherein the means to generate the expanded labeled data further comprises determining means to determine with a high confidence that the at least a portion of the unlabeled data can be viewed as labeled data, the high confidence being based on proximity of respective ones of the at least a portion of the unlabeled data to cluster centroids.

33. A computing device as recited in claim 30, wherein the means to train the one or more discriminative classifiers further comprises propagating means to propagate label data to the unlabeled data as a function of clustering results to obtain a substantially low generalization error on unseen data.

34. A computing device as recited in claim 30, wherein the means to train the one or more discriminative classifiers further comprises combining means to combine clustering and classification through iterative reinforcement until all examples in a particular classifier of the one or more discriminative classifiers are labeled.

35. A computing device as recited in claim 34, wherein the one or more discriminative clusters are based on all available data and represent an approximately correct classifier $L_1$, and wherein the iterative reinforcement comprises aspects of the means to generate and the means to train, the iterative reinforcement comprising:

selecting means to select unlabeled data samples from the unlabeled data, the unlabeled data samples being confidently classified as a function of $L_1$;

combining means to combine the unlabeled data samples with original labeled data to train a new model $L_2$; and performing means to implement the selecting and combining means until all examples in the new model are labeled.

* * * * *